Dec. 2, 1930.  B. F. GEYER ET AL  1,783,644
VISIBLE FLOW INDICATOR
Filed Oct. 5, 1929
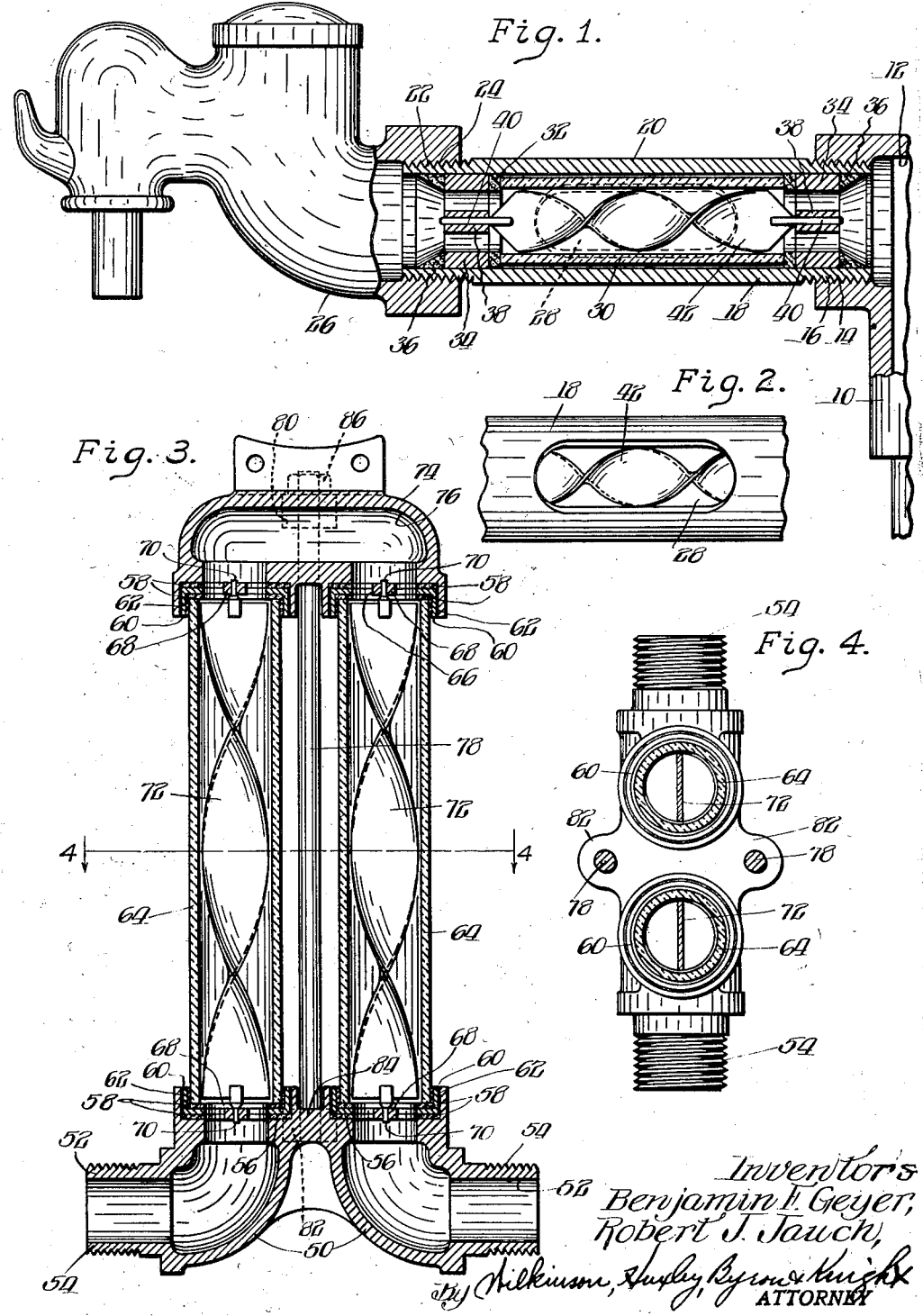
Inventors
Benjamin F. Geyer,
Robert J. Jauch, Patented Dec. 2, 1930

1,783,644

UNITED STATES PATENT OFFICE

BENJAMIN F. GEYER AND ROBERT J. JAUCH, OF FORT WAYNE, INDIANA, ASSIGNORS TO WAYNE COMPANY, OF FORT WAYNE, INDIANA, A CORPORATION OF INDIANA

VISIBLE FLOW INDICATOR

Application filed October 5, 1929. Serial No. 397,593.

This invention pertains to indicating devices, and more particularly to visible indicators for use with liquid dispensing apparatus for showing the flow of liquid therethrough.

In various types of liquid dispensing apparatus, there are provided meters for determining the amount of liquid passing through the device, which meters by virtue of their registry show whether or not liquid is passing through the apparatus. However, these meters do not always function and so may not indicate either the amount of liquid actually being discharged or that liquid is being discharged, as very few of the meters are at the discharge nozzle and also most discharge nozzles are blind when the apparatus is operative. This is particularly true in gasoline dispensing apparatus of some types wherein the hose end is applied to the gooseneck of the tank for the filling of the tank. In such cases, it is oftentimes very difficult to determine whether any liquid is flowing through the hose except by partially removing the hose, with consequent spilling. Many buyers desire to view the clarity of the oil or gasoline purchased, and any device which will permit or accentuate the clarity is very desirable.

It is therefore an object of this invention to provide a visible indicating device for showing the actual flow of liquid through a particular part of a dispensing apparatus.

Another object of the invention is to provide an indicating device for displaying and circulating liquid whereby the customer has visible evidence that the liquid for which he is paying is being delivered from the storage tank through the discharge nozzle into his receiving receptacle.

Another object is to provide an indicating device which incorporates with flow indication the feature of attractively displaying various grades or colors of materials such as lubricating oils.

Still another object of the invention is to provide a flow indicator which functions immediately the flow of fluid starts therethrough, the indicator being disposed so that the chance of fluid passing therethrough without animating the device is minimized.

A further object is to provide an indicating device of such character that sudden flow of fluid therethrough, even under pressure, will not damage the device.

With these and various other objects in view, the invention may consist of certain novel features of construction and operation, as will be more fully described and particularly pointed out in the specification, drawings and claims appended hereto.

In the drawings, which illustrate embodiments of the device and wherein like reference characters are used to designate like parts—

Figure 1 is a fragmentary sectional elevation of an assembly of a liquid dispensing nozzle of any suitable type connected to a lubricating oil dispensing pump, showing the application of the indicating device thereto;

Figure 2 is a fragmentary elevation of the outer casing or housing of the indicating device, showing the method of displaying the indicator thereof;

Figure 3 is a vertical sectional elevation of an assembly of a plurality of associated indicating devices; and Figure 4 is a sectional top plan view of the device illustrated in Figure 3, the same being taken substantially in the plane as indicated by the line 4—4 of Figure 3.

In the application of this invention to liquid dispensing apparatus, the indicator is adapted to be associated with gasoline or lubricating oil dispensing apparatus, such as are commonly installed at automobile filling stations, garages, airports, etc. However, it will be understood that there is no limit to its adaptability to other dispensing apparatus or parts of other systems. With the type of indicator contemplated, and to be particularly described, successful operation is effected either in a horizontal or upright position or any intermediate position, and the device is not a one way device, either end being adaptable for the inlet or outlet.

Referring now more particularly to the form of device illustrated in Figures 1 and 2, as applied to a lubricating pump, a portion 10 of the discharge portion of said pump is provided with an outlet portion 12, threaded as at 14 for the reception of the correspondingly threaded end portion 16 of the outer casing or housing 18 of the flow indicator 20. The housing 18 is threaded at 22 for cooperation with corresponding threads 24 provided on the discharge nozzle 26. Casing 18 of the indicator is provided with sight slots or windows 28, shown as longitudinally disposed in the side of the outer casing for the purpose of exposing the flow mechanism provided in said housing. A glass cylinder or inner casing 30 is disposed in the housing and maintained in fluid tight operative position therein by contact at opposite ends with cork gaskets 32, said cork gaskets bearing against pivot shaft bearing rings or spiders 34, in turn sealed by litharge or other suitable sealing substances 36. The spiders or pivot shaft bearing rings 34 are each provided with pivot shaft bearings 38, which are aligned in the assembly and are adapted to receive pivot shafts 40 which are preferably securely fastened to opposite ends of the whirler or other indicating device 42. This whirler in the embodiment shown is of substantially helical or spiral form, the whirlers being of such size as to provide very little clearance between the outer edges thereof and the glass cylinders or casing 30.

From this embodiment it will be appreciated that when oil is pumped through a portion of the pump 10 to the indicator, it will pass through the indicator, the oil being separated by the whirling and causing whirling movement of the helical whirler 42 about its bearings, the oil then passing through the discharge nozzle 26 to the receiving container.

In other devices, such as gasoline dispensing apparatus, it may be desirable to provide a plurality of indicating devices in order to produce a better effect in displaying the clarity of the liquid passing through the indicating device. In the embodiment of the device illustrated particularly in Figures 3 and 4, the metallic casing may be dispensed with, and in this case, the twin cylinder supported or disposed on the circulating body support 50 is provided with an entrance and an exit 52 suitably threaded at 54 for application to portions of the dispensing apparatus, the entrance and exit being identical and terminating upwardly in seats 56 for the reception of suitable cork gaskets 58, between which are disposed cylinder sockets 60 of substantially cup shape for retaining one of the gaskets, and sealing means 62, such as litharge, the retained gasket supporting the respective transparent cylinder 64. Spiders 66 having bearings 68 for the reception of the pivot shafts 70 of the whirlers 72 are provided at each end of each cylinder, lower bearings 68 being aligned with upper bearings 68, it being understood that the upper of said cylinder sockets and cork gaskets 58 are sealed by means of the litharge to a cap 74 having a passage 76 therein communicating with each glass cylinder and providing connection therebetween whereby liquid passes upwardly through one glass cylinder and downwardly through the other. The cap 74 and circulating body support 50 are preferably retained in fixed and spaced relation by means of the tie rods 78 secured in place to upper and lower ears 80 and 82 by means of the threaded portions 84 and nuts 86.

If such device then is applied between the liquid dispensing hose and the pump of a gasoline pump, the hose nozzle may be placed in the gasoline tank of a vehicle and the pump operated, whereby gasoline will flow through the entrance up through one cylinder 64, actuating the helical whirler 72, thence through the cap 74 and downwardly through the other cylinder 64, actuating its whirler 72, and thence passing outward through the exit portion to the hose.

With the invention constructed as described, the spirally twisted or helically arranged piece of flat steel or other appropriate metal pivots to create a whirling action when liquid passes through the tube. It is preferred that this whirler be nickel plated or polished aluminum to give it a more attractive appearance and to give a better effect of clarity to the liquid passing through the tube. This is perhaps more clearly understood when considering the density of lubricating oil viewed through a transparent tube of considerable diameter, and then realizing that only half of the volume of lubricating oil is seen at any time when passing through the transparent cylindrical tube of the device contemplated in this invention, the full view of the circulating oil being obstructed by the whirler. Thus the density of that portion of the oil passing before the eyes is actually reduced and the oil appears more transparent.

Another important feature of the device is that there can be no air pockets formed in the pump system due to the disposition and operation of the parts, and any air bubbles or other foreign fluid which may get into the system from any cause whatever, are readily expelled along with the liquid.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a fitting adapted to be associated with a fluid conducting member, the combination of a tubular housing having a window therein, and a spiral member mounted adjacent said window and adapted to be moved by flow of fluid in said housing whereby said spiral member may be viewed from said window.

2. In a self-contained fitting adapted to be associated with a fluid conducting member, the combination of a transparent housing, a bearing disposed in said housing, a member pivotally mounted on said bearing and being adapted to move as fluid moves through said housing.

3. In a fitting adapted to be associated with a fluid conducting member, the combination of transparent substantially parallelly arranged communicating housings, a bearing associated with each housing, and a member pivotally mounted on each bearing and being adapted to move as fluid passes through each housing.

4. In a fitting adapted to be associated with a fluid conducting member, the combination of a body portion having an entrance and exit, transparent housings disposed on said body portion, a member connecting said housings whereby fluid may pass through said fitting from said entrance to said exit, and a member mounted in each housing and movable by fluid passing through said fitting.

5. In a fitting adapted to be associated with a fluid conducting member, the combination of a body portion having an entrance and exit, transparent housings disposed on said body portion, a member connecting said housings whereby fluid may pass through said fitting from said entrance to said exit, sealing means disposed between each housing and said body portion and said last named member, bearings disposed at each end of said housings, and a spiral member mounted to turn on said bearings and movable by fluid passing through said fitting, said spiral members substantially filling said housings whereby no fluid can flow through said housings without actuating said spiral member.

6. In a flow indicating device, the combination of a casing having a window therein, a transparent housing in said casing, and a reflecting member mounted in said housing and disposed adjacent said window whereby fluid flow through said device is indicated and the clarity of the fluid passing through said housing is accentuated by said reflecting member.

7. In a self-contained indicating fitting, the combination of a discharge pipe, and means in said pipe for indicating the flow of liquid through said pipe and preventing trapping of extraneous fluid in said pipe, said means having a portion whereby said means may be viewed.

Signed at Fort Wayne, Indiana, this thirtieth day of September, 1929.

BENJAMIN F. GEYER.
ROBERT J. JAUCH.